United States Patent
Watson et al.

(10) Patent No.: US 6,779,033 B1
(45) Date of Patent: Aug. 17, 2004

(54) SYSTEM AND METHOD FOR TRANSACTING A VALIDATED APPLICATION SESSION IN A NETWORKED COMPUTING ENVIRONMENT

(75) Inventors: Robert N. M. Watson, Bethesda, MD (US); Olafur Gudmundsson, Washington, DC (US); Darrell Kindred, Columbia, MD (US)

(73) Assignee: Networks Associates Technology, Inc., Santa Clara, CA (US)

( * ) Notice: Subject to any disclaimer, the term of this patent is extended or adjusted under 35 U.S.C. 154(b) by 840 days.

(21) Appl. No.: 09/750,966

(22) Filed: Dec. 28, 2000

(51) Int. Cl.[7] .............................................. G06F 15/16
(52) U.S. Cl. ...................................... 709/227; 709/228
(58) Field of Search ................................ 709/203, 227, 709/228; 713/201

(56) References Cited

U.S. PATENT DOCUMENTS

| | | | |
|---|---|---|---|
| 6,606,708 B1 * | 8/2003 | Devine et al. ............... | 713/201 |
| 6,611,869 B1 * | 8/2003 | Eschelbeck et al. ........ | 709/228 |
| 2003/0041263 A1 * | 2/2003 | Devine et al. ............... | 713/201 |

OTHER PUBLICATIONS

Bernstein D, "TCP SYN Cookies," on–line journal, http://cr.yp.to/syncookies.html, 1996.

Cisco Systems, Inc., "Configuring TCP Intercept (Prevent Denial of Service Attacks)," http://www.cisco.com/univercd/cc/td/doc/product/software/ios113ed/113ed_cr/secur_c/scprt3/scdenial. tm, pp. SC–157–162, (Dec. 1997).

Check Point Software Technologies, Ltd., "TCP SYN Flooding Attack and the FireWall–1 SYNDefender," http://www.checkpoint.com/products/firewall–1/syndefender.html, pp. 1–6 (1996).

D.J. Bernstein, http://cr.yp.to/syncookies/idea (1996).

D.J. Bernstein, http://cr.yp.to/syncookies/archive (1996).

* cited by examiner

*Primary Examiner*—Krisna Lim
(74) *Attorney, Agent, or Firm*—Patrick J. S. Inouye; Christopher J. Hamaty

(57) ABSTRACT

A system and method for transacting a validated application session in a networked computing environment is described. A hierarchical protocol stack having a plurality of interfaced protocol layers is defined. A connection-based session protocol layer is included. A session is opened with a requesting client responsive to a request packet containing a source address of uncertain trustworthiness. A client connection with the requesting client is negotiated. A stateless validation of the source address contained in the request packet is performed using encoded information obtained from the request packet headers. A server connection is negotiated with a responding server upon successful validation of the requesting client. The session is facilitated by translating packets independently exchanged over the client connection and the server connection. The session is closed through a controlled termination of each of the client connection and the server connection.

22 Claims, 16 Drawing Sheets

SYSTEM AND METHOD FOR TRANSACTING A VALIDATED APPLICATION SESSION IN A NETWORKED COMPUTING ENVIRONMENT

FIELD OF THE INVENTION

The present invention relates in general to networked computing environment protection, and, in particular, to a system and method for transacting a validated application session in a networked computing environment.

BACKGROUND OF THE INVENTION

Computer networks form a central component of corporate information technology infrastructures. There are two types of networks. A local area network or "intranetwork" is a network operating within a single identifiable location, such as on one floor of a building. Individual computers and shared resources are interconnected over a single media segment. A wide area network or "internetwork" is a network consisting of interconnected intranetworks and geographically distributed computational resources which, when taken as a whole, comprise a unified set of loosely associated computers. The Internet, for example, is a public internetwork interconnecting clients worldwide.

Structurally, most internetworks and intranetworks are based on a layered network model employing a stack of standardized protocol layers. The Transmission Control Protocol/Internet Protocol (TCP/IP) suite, such as described in W. R. Stevens, "TCP/IP Illustrated," Vol. 1, Ch. 1 et seq., Addison-Wesley (1994), the disclosure of which is incorporated herein by reference, is a widely adopted network model. Computers and network resources using the TCP/IP suite implement hierarchical protocol stacks that include link, network, transport and, for client and servers, application protocol layers.

The application protocol layers enable host end devices to provide client services, such as communications, file transfer, electronic mail, content retrieval, and resource sharing. Application protocol layers are either connection-oriented or connectionless. A connection is a negotiated link interconnecting a host and client used to transaction a communication session during which packets are exchanged between the host and client application protocol layers.

Connections are created by the transport protocol layers. For instance, the Transmission Control Protocol (TCP) provides a connection-oriented, reliable, byte stream service that can be used by application layer protocols to transact sessions. Communication sessions require the stepwise initiation and termination of a dedicated connection. TCP sessions must be initiated through a negotiated three-way handshaking sequence and preferably terminated with a four-segment sequence that gracefully closes the connection.

TCP-based networks are particularly susceptible to a type of attack known as a denial of service ("DoS") attack. Ordinarily, a TCP server will reserve state, such as memory buffers, upon receiving a service request from a client in the expectation of having to process transient data packets during a communications session. However, a state consumption attack attempts to force a victim server to allocate state for unproductive uses during the three-way handshaking sequence. In a DoS attack, an attacker will cause a high volume of bogus service requests to be sent to a victim server which will continue to allocate state until all available state is expended. Thus, no state will be left for valid requesters and service will be denied. In addition, DoS attacks are difficult to detect because the bogus service requests are indistinguishable from normal network traffic.

One form of DoS attack employs "spoofed" packet source addresses. A spoofed packet is a data packet sent by a third party containing a source address other than the source address of that third party. The fraudulent source address could be the address of another system or might be a random source address that is valid yet not presently in use. Unfortunately, TCP does not provide means for ensuring that packet source addresses are not fraudulent. Attackers take advantage of this security hole by sending service request packets with fraudulent source addresses to disguise their identity. Consequently, tracing the source of spoofed DoS attacks is often meaningless and the attackers are virtually untraceable.

In the prior art, host-based and intermediary-based protections have been employed to counter spoofed DoS attacks. One type of host-based protection uses improved connection-state management. Connection-state storage is either allocated on demand or allocated in a reduced amount for incomplete connections, for instance, by delaying storage of elements not relevant until the connection is established. This approach creates new vulnerabilities, as an attack could compromise facilities other than connection management and does not eliminate the vulnerability.

Another type of host-based protection shortens connection-termination timeouts. In general, or during a detected DoS attack, a server can reclaim state for incomplete connections sooner than the protocol specification allows. This approach increases a capacity to handle incomplete connections, but reduces robustness in the case of legitimate messages delayed in the network.

A third type of host-based protection implements stateless connection negotiation whereby the server avoids maintaining state until client legitimacy has been established. State information is securely encoded in messages sent to the client in a form that is recoverable from client messages. This approach prevents state consumption attacks by attackers that fail to respond to messages from the server. However, the encoding is sometimes expensive for the host to compute and this approach requires the host operating system to be modified.

Intermediary-based protections are employed by devices located between protected servers and potential attackers. These devices include firewalls, proxies, routers, switches and load balancers. In one approach, the intermediary estimates the amount of host state dedicated to incomplete connections and forcefully terminates suspect connections by injecting connection-reset commands. The intermediary enforces shorter timeouts, preferably upon detecting an attack. This approach offers modest server protection without changes to the server operating system, but leaves the intermediary vulnerable to state-consumption attacks. The approach also fails to address choosing which connections to terminate without affecting legitimate traffic.

Another intermediary-based protection performs stateful connection-binding interception in which the intermediary performs connection negotiation on behalf of the server. Once the client has completed the connection negotiation, the intermediary initiates a second connection to the server on behalf of the client and patches the two connections together by translating messages sent between client and server. This approach shields the server from spurious connection attempts, but leaves the intermediary vulnerable to state consumption attacks.

Finally, both hosts and intermediaries can filter packets by comparing the source addresses of incoming packets to lists of individual addresses for "bad" hosts. However, these addresses must be periodically updated and reloaded. Loading this information once a DoS attack is underway is too late to be of practical use. More importantly, though, most, if not all, of the packets used to produce a DoS attack will appear valid, as there is no a priori method to sort spoofed packets from non-spoofed packets.

Therefore, there is a need for a solution to protecting negotiated application protocol layer sessions against DoS attacks, such as in a TCP-based computing environment. There is a further need for a dynamic approach to packet validity checking which can detect spoofed, fictitious, and inactive addresses without requiring state allocation or compromising connection robustness.

SUMMARY OF THE INVENTION

The present invention provides a system and method for validating a session request and transacting a communication session for a validated connection. An intermediary receives a session request from a requesting client. A SYN cookie is generated and a session is opened only if the SYN cookie is properly acknowledged by the requesting client. A connection is initiated with a responding server and the session is transacted by translating sequence numbers by an offset reflecting the client versus the server sequence numbers. The session is terminated upon the request of either the client or server.

An embodiment of the present invention is a system and method for transacting a validated application session in a networked computing environment. A hierarchical protocol stack having a plurality of interfaced protocol layers is defined. A connection-based session protocol layer is included. A session is opened with a requesting client responsive to a request packet containing a source address of uncertain trustworthiness. A client connection with the requesting client is negotiated. A stateless validation of the source address contained in the request packet is performed using encoded information obtained from the request packet headers. A server connection is negotiated with a responding server upon successful validation of the requesting client. The session is facilitated by translating packets independently exchanged over the client connection and the server connection. The session is closed through a controlled termination of each of the client connection and the server connection.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
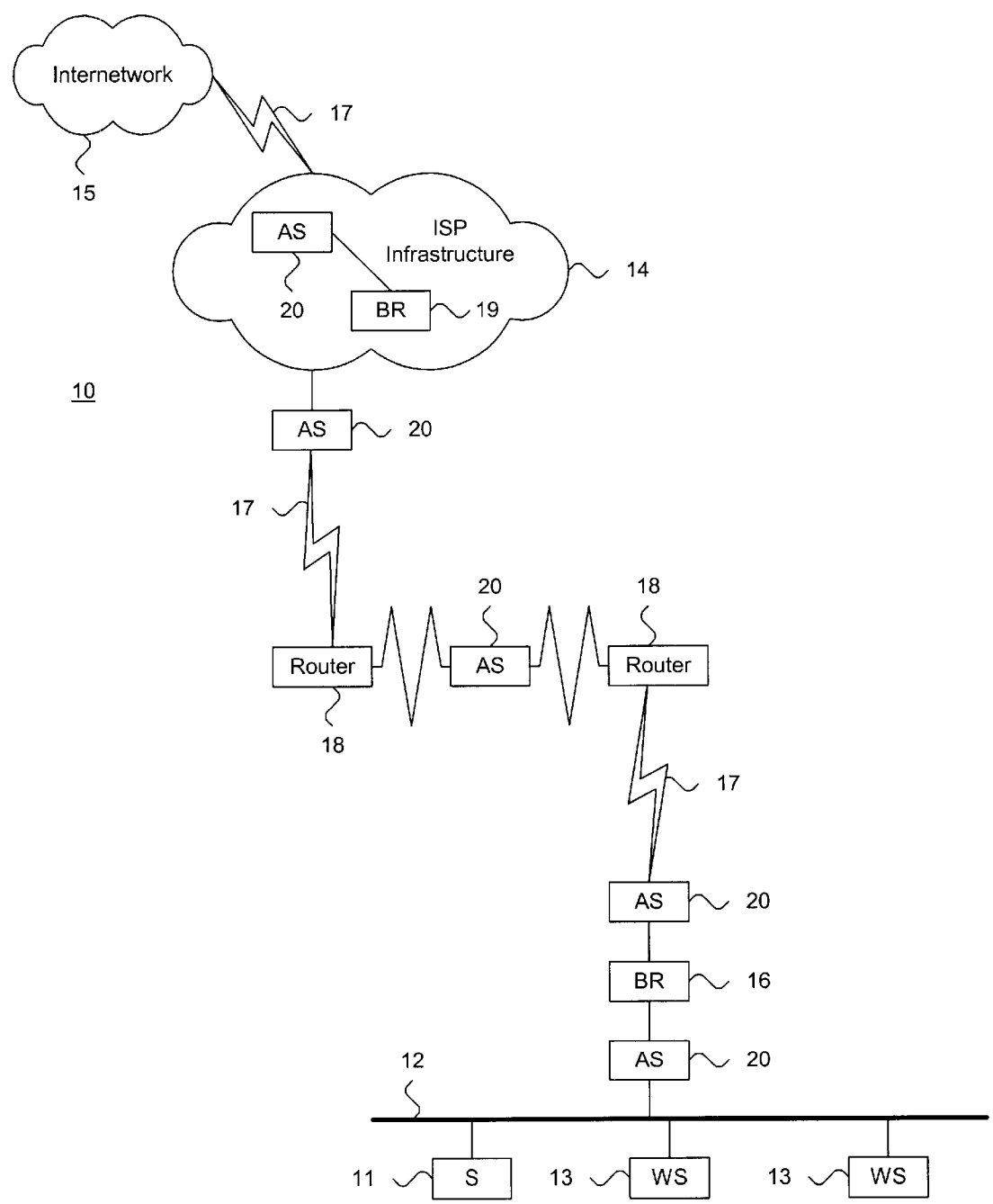
FIG. 1 is a block diagram showing a networked computing environment, including a system for transacting a validated application session, in accordance with the present invention.

FIG. 1 is a block diagram showing a networked computing environment 10, including an authentication system (AS) 20 for transacting a validated application session, in accordance with the present invention. The environment 10 includes a intranetwork 12 interconnected with an internetwork 15, such as the Internet, by means of an Internetwork Service Provider (ISP) infrastructure 14. The intranetwork 12 includes a local server 11 (S) with a plurality of workstations (WS) 13 and similar network resources. Internally, the ISP infrastructure 14 includes a plurality of network service support machines, including high bandwidth routers, servers, and related support equipment, as is known in the art.

The intranetwork 12 interfaces to the internetwork 15 through a series of high- and low-bandwidth connections. A high-bandwidth connection 17, such as an optical carrier OC-3 (155.52 Mbps) or OC-12 (622.08 Mbps) line, connects the intranetwork 12 to a pair of routers 18 which exchange data over low-bandwidth commercial lines. The intranetwork 12 interfaces to the high-bandwidth connection 17 through a border router 16 (BR) or similar device. Similarly, the ISP infrastructure 14 interfaces to the router 18 over a high-bandwidth connection 17 through a border router 19.

Figure 2:
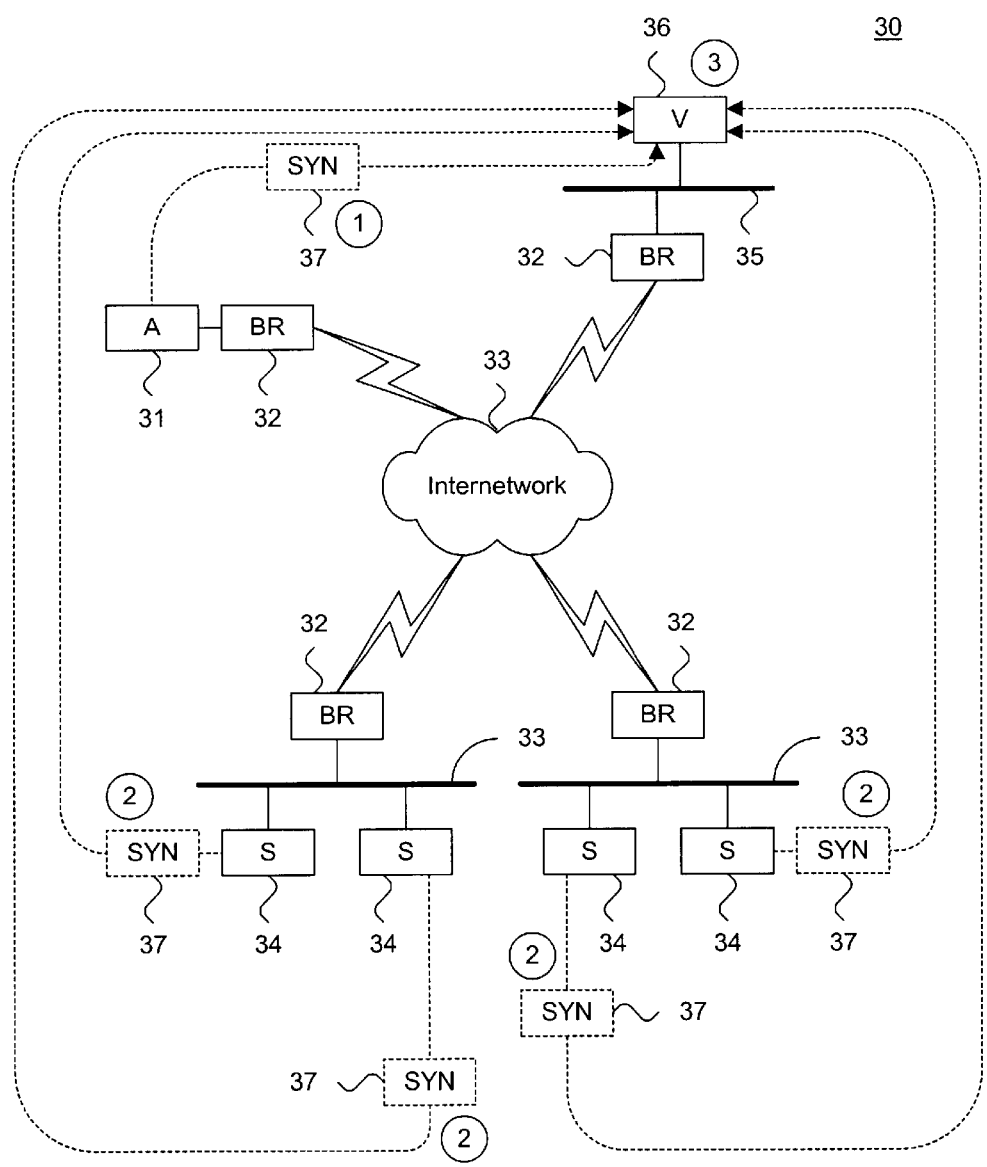
FIG. 2 is a network diagram illustrating, by way of example, the progression of a state consumption attack.

The server 11 is susceptible to denial of service (DoS) attacks, particularly state consumption attacks, as further described below with respect to FIG. 2. As protection against DoS attacks, the authentication system 20 can be placed at various locations within the distributed computing environment 10, including within the ISP infrastructure 14, between the ISP infrastructure 14 and a router 18, between the pair of routers 18, between a router 18 and a border router 16, and between the border router 16 and the intranetwork 12. As protection against DoS attacks, the authentication system 20 can be placed at between the border router 16 and the intranetwork 12. The authentication system 20 incorporates a system for transacting a validated application session in a networked computing environment, as further described below beginning with reference to FIG. 5.

The individual computer systems 11 and 13 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

State consumption attacks are a specific type of DoS attack that can cripple or disable network servers 11 through bogus session requests. FIG. 2 is a network diagram 30 illustrating, by way of example, the progression of a state consumption attack. The goal of a state consumption attack is to induce a victim server 36 into allocating state, such as memory buffers and similar limited resources, through incomplete service requests. State consumption attacks occur in TCP/IP compliant computing environments with connection-oriented protocols, such as TCP.

Although several forms of state consumption attacks exist, the SYN attack is the most notorious. This type of attack relies upon inherent limitations in the TCP protocol. Ordinarily, when opening a new connection, a server 36 performs a three-way handshake sequence with a requesting client. The three-way handshake is further described in W. R. Stevens, "TCP/IP Illustrated," Vol. 1, Ch. 18, Addison-Wesley (1994), the disclosure of which is incorporated herein by reference. Briefly, the handshake begins when a requesting client sends a synchronize (SYN) request to a server with which the client wishes to establish a connection. The server allocates state upon receipt of the SYN request and sends a SYN/acknowledgement (ACK) response back to the requesting client. The client then sends back an ACK to confirm and establish the connection.

A state consumption attack progresses as follows. A plurality of individual intranetworks 33, 35 are interconnected via an internetwork 33 using conventional low- and high-bandwidth carriers interfaced via border routers 32 or similar devices. Other network topologies and configurations are feasible. An attacker 31 sends a stream of SYN request packets 37 with a fraudulent, that is, "spoofed," source address to a victim server 36 (step 1). The attacker 31 might also induce a plurality of servers 34 to send fraudulent SYN request packets 37 (step 2), such as through broadcast messaging. In turn, the victim server 36 allocates state (step 3) and sends SYN/ACK response packets to the system indicated in the source address of each SYN request packet 37. However, since the source addresses are spoofed, no ACK packets are returned and the state on the victim server 36 remains allocated until each request times out. If a sufficient number of SYN request packets 37 are sent in rapid succession, all available state in the victim server 36 will be allocated in reliance on the fraudulent SYN request packets 37. Thus, no state will be available for valid requests and the service will be denied.

Unfortunately, the SYN request packets 37 used to attack victim servers 36 resemble valid, bona fide traffic. DoS attacks are difficult to detect and state consumption attacks can also target ISP infrastructures 14 (shown in FIG. 1) resulting in a wider impact. Two solutions to preventing spoofed DoS attacks related to the present invention are described in the commonly assigned U.S. patent applications Ser. No. 09/655,515, filed Aug. 31, 2000, pending, and Ser. No. 09/655,459, filed Aug. 31, 2000, pending, the disclosures of which are incorporated by reference.

Figure 3:
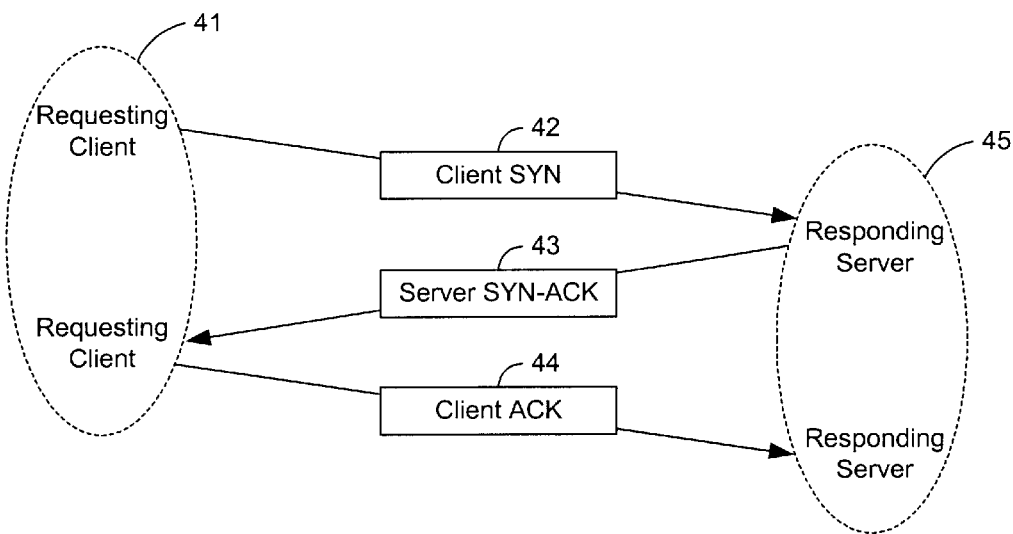
FIG. 3 is a timing diagram showing, by way of example, the three-way handshake performed during the initiation of a TCP session.

Spoofed SYN attacks deliberately misuse the three-way handshake sequence 40 executed between peer TCP layers to effect a DoS attack. FIG. 3 is a timing diagram showing, by way of example, the three-way handshake 40 performed during the initiation of a TCP session. Ordinarily, the handshake sequence 40 is transacted between a requesting client 41 and a responding server 45. Upon successful completion of the handshake sequence, session-based programs in the application protocol layers of the client 41 and server 45 communicate by exchanging TCP packets.

The TCP three-way handshake consists of three exchanges, such as described in W. R. Stevens, "TCP/IP Illustrated," Vol. 1, Chs. 17–18, Addison-Wesley (1994), and Postel, J. B., "Transmission Control Protocol," RFC 793 (September 1981), the disclosures of which are incorporated herein by reference. First, an initiating client sends a synchronize (SYN) packet 42 to a server. The SYN packet 42 has an internet protocol (IP) header containing fields for storing a source address and destination address and a TCP header containing fields for storing a source port number, destination port number, and sequence number n. The sequence number n is a 32-bit unsigned integer chosen by the initiating client.

The server responds by sending a SYN-acknowledgement (ACK) packet 43 addressed to the system located at the source address. The SYN-ACK packet 43 also has an IP header containing fields for storing a source address and destination address and a TCP header containing fields for storing a source port number, destination port number, sequence number n, plus an acknowledgement number m. The acknowledgement number m is also a 32-bit unsigned integer. The client's sequence number n is incremented by one to indicate acknowledgement by the server and is sent back to the system located at the source address in the acknowledgement number m field. In addition, the server includes its own sequence number in the sequence number n field.

Assuming the source address is valid, the initiating client returns an ACK packet 44 with the TCP header containing the sequence number n chosen by the server incremented by one in the acknowledgement field to indicate acknowledgement by the client. Thus, upon successful completion of the three-way handshake, the sequence number n field of the ACK packet 44 contains the client sequence number plus one and the acknowledgement number m field contains the server sequence number plus one.

Figure 4:
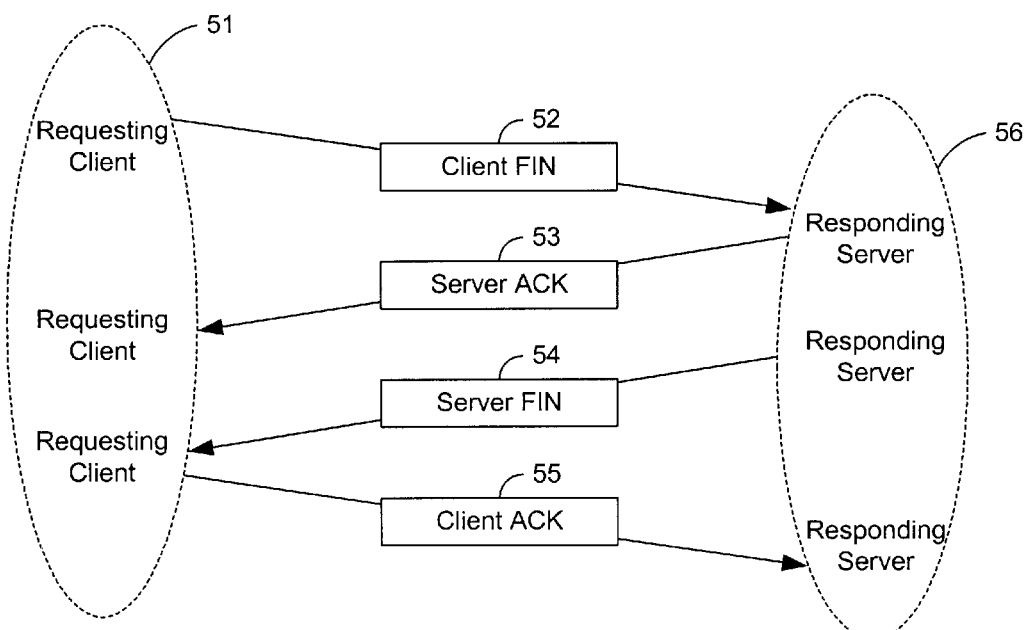
FIG. 4 is a timing diagram showing, by way of example, the four-segment sequence performed during the termination of a TCP session.

Upon the successful completion of the three-way handshake, the client and server exchange packets until the session is terminated. Preferably, the connection is gracefully terminated using the four-segment sequence, rather than via an abnormal termination that ends the session by abruptly ending all packet traffic. FIG. 4 is a timing diagram showing, by way of example, the four-segment sequence 50 performed during the termination of a TCP session.

Either the client 51 or server 56 can initiate the termination of a TCP session. The actual connection between a client 51 and server 56 consists of a pair of half duplex lines which operate independently of each other. Each half duplex line must be separately terminated. Generally, the requesting client 51 starts the termination sequence by sending a finish (FIN) packet 52. This packet notifies the server 56 that the client 51 is closing down the half duplex link sending packets from the client 51 to the server 56. The server 56 acknowledges the FIN packet 52 by sending an ACK packet 53. In addition, the server 56 notifies the client 51 that the server 56 is also closing down the half duplex link sending packets from the server 56 to the client 51. The server 56 sends a FIN packet 54 which the client 51 acknowledges with an ACK packet 55. The session is now terminated.

Figure 5:
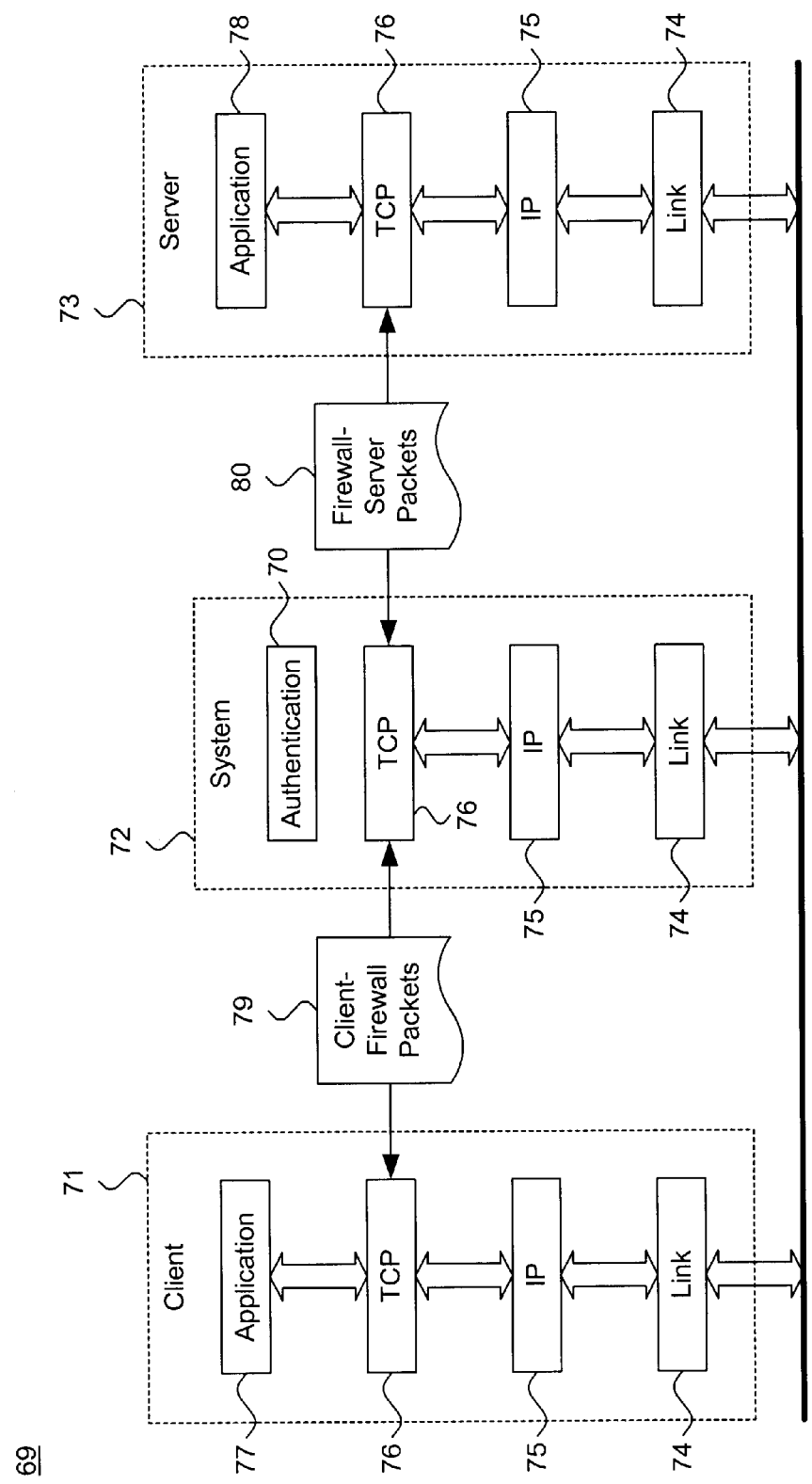
FIG. 5 is a block diagram showing an authentication system for transacting a validated application session for use in a networked computing environment.

FIG. 5 is a block diagram showing an authentication system 72 for transacting a validated application session for use in a networked computing environment 69. For the purpose of illustrating how to prevent spoofed DoS attacks, the networked computing environment 69 consists of three types of systems: a requesting client 71, the authentication system 72, and a responding server 73. Each of these systems implement a TCP/IP network protocol stack which includes link 74, IP 75 and TCP 76, layers, such as described in W. R. Stevens, "TCP/IP Illustrated," Vol. 1, Ch. 1 et seq., Addison-Wesley (1994), the disclosure of which is incorporated herein by reference. In addition, both the client 71 and server 73 implement client application 77 and server application 78 layers. In the case of a DoS attack on the server 73, the client application 77 is a malicious application that bypasses normal the normal client TCP layer 76 and IP layer 75 to send spoofed segments in an attempt to consume the state of the TCP layer 76 of the server 73.

In the described embodiment, the system 72 intercedes between the client 71 and the server 73 via an authentication module 70. The authentication module 70 performs the three-way handshake sequence to prevent DoS attacks and transacts and terminates communication sessions, as further described below with reference to FIG. 6. The system 72 functions as a pseudo server by exchanging client-system packets 79 with the client 71 and system-server packets 80 with the server 73. A client-system handshake sequence is first attempted and, if authenticated, a system-server handshake sequence is then performed.

In the described embodiment, the authentication module 70 is incorporated in a system 72 operating on a programmed digital computer. As is conventional in the art, the system 72 operates under the control of an operating system, such as the Unix or Windows NT operating systems. Alternatively, the authentication module 70 could be incorporated directly into a network protocol stack, such as a TCP/IP stack running on either a firewall, server, or client. As well, the authentication module 70 could be implemented as a stand-alone program or as a program module working in conjunction with an operating system, protocol stack, or other application, procedure, driver, or module. Finally, the authentication module 70 could be implemented entirely or partly in hardware, firmware, or software, as would be recognized by one skilled in the art. In particular, the translation module, discussed below with reference to FIG. 7, could be efficiently implemented in hardware to optimize the client-system and system-server sequence number conversions.

Figure 6:
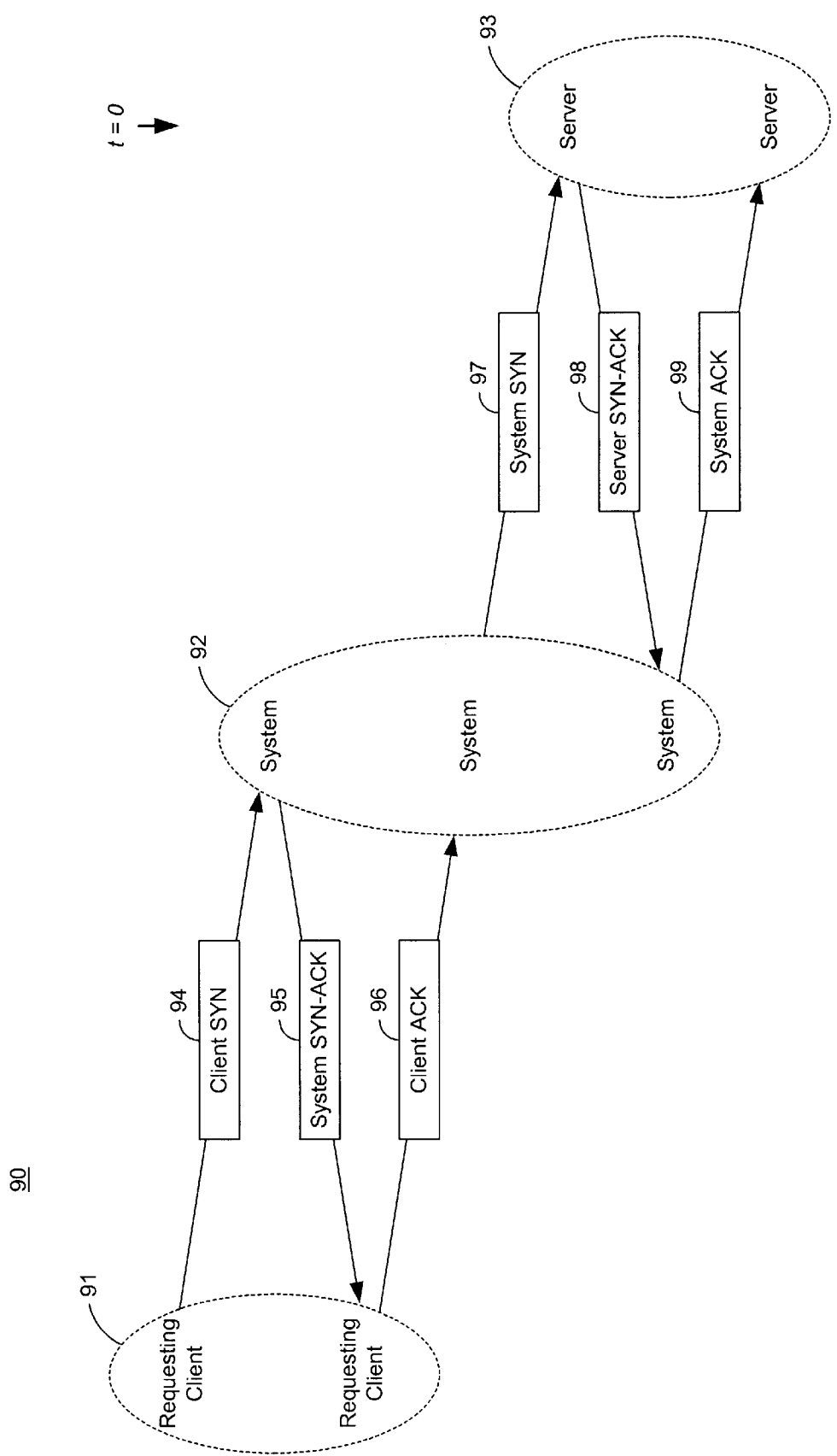
FIG. 6 is a timing diagram showing, by way of example, the authentication of an incoming TCP connection request.

FIG. 6 is a timing diagram 90 showing, by way of example, the authentication of an incoming TCP connection request. Briefly, an authentication system 92 intercepts a session request from a requesting client 91 and only forwards the session request to a server 93 after checking the existence or validity of the requesting client 91. Non-existent or invalid session requests are discarded, thereby preventing state consumption leading up to a DoS attack.

Chronologically, a requesting "client" 91 sends a client SYN packet 94 to the server 93. However, the authentication system 92 intercepts the client SYN packet 94 and generates a system SYN-ACK packet 95. No state on the authentication system 92 is consumed. The system SYN-ACK packet 95 contains a pseudo sequence number, preferably cryptographically generated, as further described below with respect of FIG. 15.

The system SYN-ACK packet 95 is addressed to the system at the source address specified in the TCP header of the client SYN packet 94. If a valid requesting client 91 sent the client SYN packet 94, the requesting client 91 will respond to the system SYN-ACK packet 95 by sending a client ACK packet 96.

However, if the client SYN packet 94 was spoofed, that is, sent with a fraudulent source address, two outcomes exist. First, if the spoofed source address is not in use by another system, no responding client ACK packet 96 will be generated and the original client SYN packet 94 will be ignored. Alternatively, if the spoofed source address is in use by another system but that system did not send the original client SYN packet 94, that system will send a client reset (RST) packet. In either case, since the authentication system 92 intercepted the spoofed client SYN packet 94 before reaching the server 93, no state is consumed or wasted, both on the server 93 and on the authentication system 92.

Assuming the client SYN packet 94 originated from a valid requesting client 91, the authentication system 92 will perform a three-way handshake with the server 93. First, the authentication system 92 sends a system SYN packet 97 to the server 93 upon receiving back a client ACK packet 96. The system SYN packet 97 contains the original sequence number contained in the TCP header of the client SYN packet 94. In response, the server 93 returns a server SYN-ACK packet 98 containing an acknowledgement number. Finally, the authentication system 92 completes the three-way handshake by responding with a system ACK packet 99. Note that the sequence numbers contained in all subsequent packets exchanged between the requesting client 91 and the server 93 during the communication session will need to be translated to account for the offset of the system-generated pseudo sequence number from the server-generated sequence number in the server SYN-ACK 98.

Figure 7:
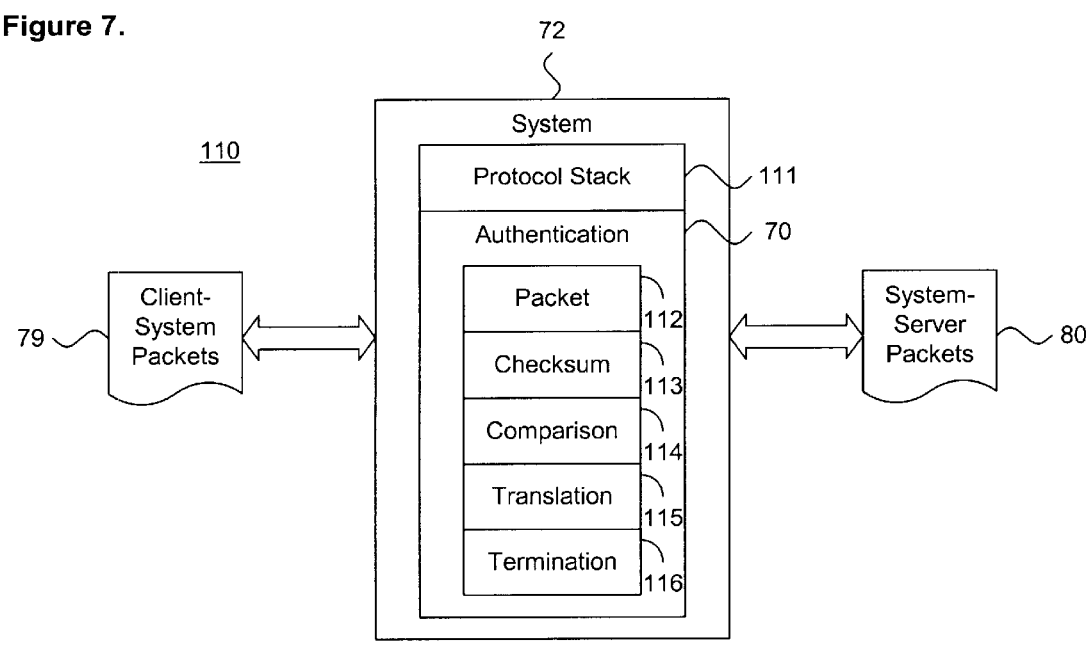
FIG. 7 is a block diagram showing the functional software modules of the authentication system of FIG. 5.

FIG. 7 is a block diagram showing the functional software modules of the authentication system 70 of FIG. 5. The authentication module 70 is incorporated into the authentication system 72 and works in conjunction with a protocol stack 111. However, the authentication module 70 could equally work as a stand-alone system or directly in conjunction with a server.

Preferably, the system 70 is placed at or in front of a boundary separating an internal network from an external network so all traffic can be checked by the system 72. Client-system packets 79 and system-server packets 80 efficiently pass through the system 70. Client-system packets 79 received from an unknown client are transparently validated by the authentication module 70.

The authentication module 70 itself consists of five main modules: packet 112, checksum 113, comparison 114, translation 115, and termination 116. Each module is a computer program or module written as source code in a conventional programming language, such as the C programming language, and is presented for execution by the CPU as object or byte code, as is known in the art. The various implementations of the source code and object and byte codes can be held on a computer-readable storage medium or embodied on a transmission medium in a carrier wave. The authentication module 72 operates in accordance with a sequence of process steps, as further described below beginning with reference to FIG. 8.

The packet module 112 performs packet housekeeping chores, including interfacing to the protocol stack 111, parsing header information for incoming packets and building headers for outgoing packets. The checksum module 113 generates a checksum, preferably cryptographic, based on information contained in the IP and TCP headers of incoming SYN packets, as further described below with reference to FIG. 15. The comparison module 114 determines whether received ACK packets are valid or forged based on checksum information. The translation module 115 converts sequence numbers of non-SYN and non-ACK packets, that is, session packets, to adjust for the offset of the server pseudo sequence number. Finally, the termination module 116 gracefully closes the connections between the client and the authentication system 72 and the system 72 and the server.

Figure 8:
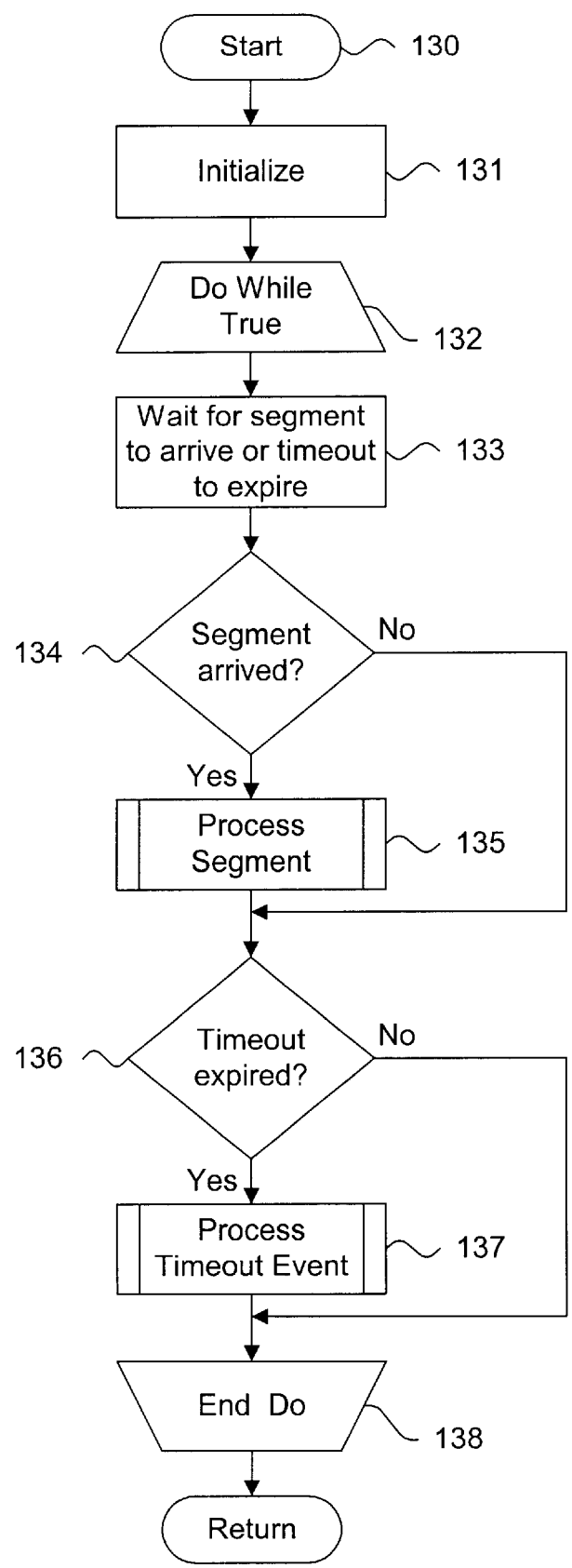
FIG. 8 is a flow diagram showing a method for transacting validated application sessions in a networked computing environment in accordance with the present invention.

FIG. 8 is a flow diagram showing a method 130 for transacting validated application sessions in a networked computing environment in accordance with the present invention. The method 130 operates in two phases. During the first phase, initialization (block 131), the protocol stack 111 (shown in FIG. 7) and authentication module 70 (shown in FIG. 5) are started and their associated data structures initialized.

During the second phase, operation (blocks 132–138), segments are iteratively processed. The authentication system 92 waits for a segment to arrive or a timeout to expire (block 133). If a segment has arrived (block 134), a routine for processing a segment is called (block 135), as further described below with reference to FIG. 9. If a timeout has expired (block 136), a routine for processing a timeout event is called (block 137), as further described below with reference to FIG. 13. Segments and timeouts are iteratively processed (blocks 132–138) and the method 130 terminates upon the unloading of the authentication module 70 or upon shutdown of the system 72.

Figure 9:
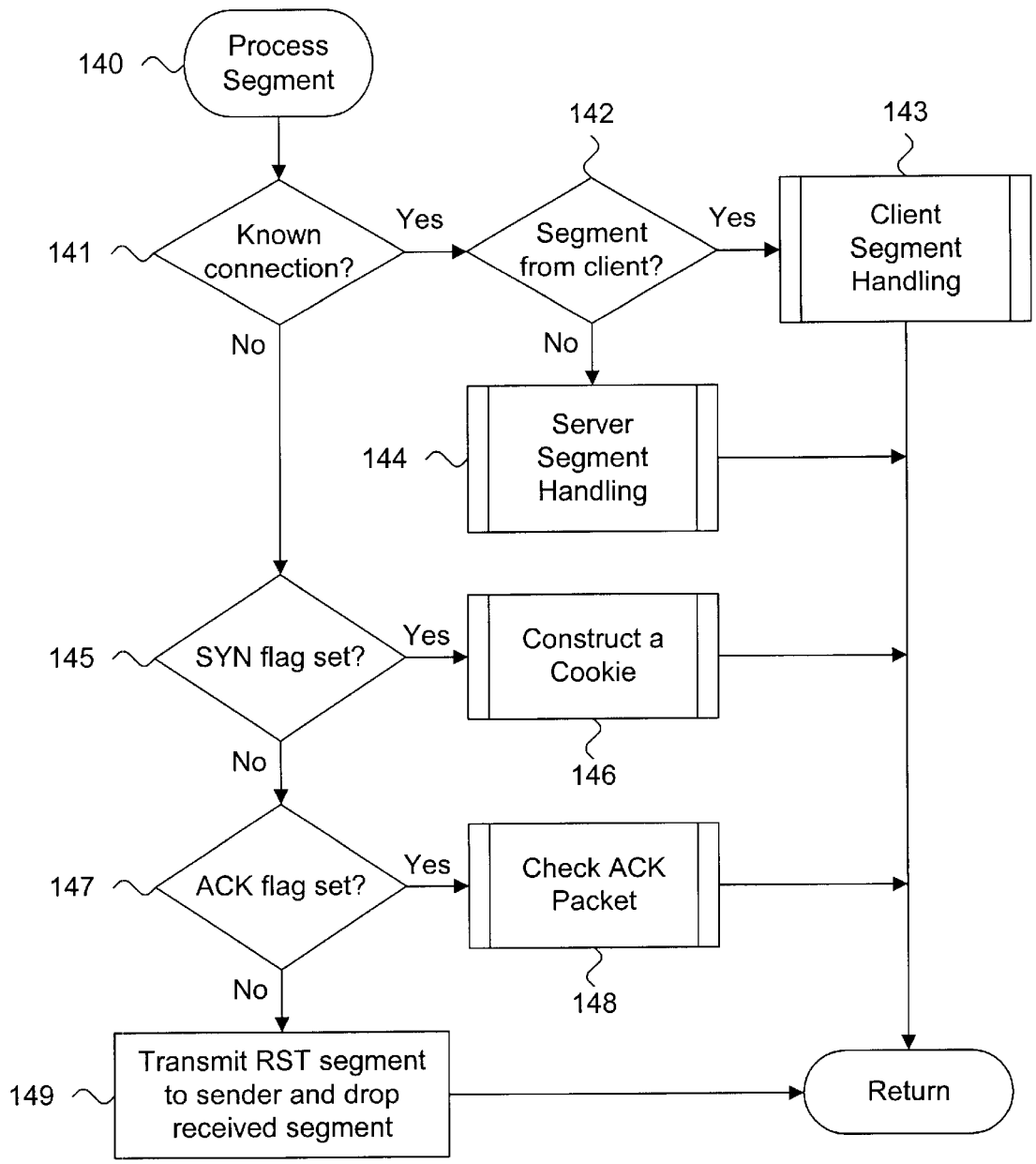
FIG. 9 is a flow diagram showing a routine for processing a segment for use in the method of FIG. 8.

FIG. 9 is a flow diagram showing a routine for processing a segment 140 for use in the method of FIG. 8. The purpose of this routine is to process or reject segments based on type and origin. If an incoming segment is from a known connection (block 141), either a routine for handling client segments (block 143) or for handling server segments (block 144) is called, depending upon the type of segment (block 142). The routines for handling client segments (block 143) and server segments (block 144) are further described below with reference to FIGS. 10 and 11A–11B, respectively.

Alternatively, if the segment is from an unknown connection (block 141), processing is performed as follows. If the synchronize (SYN) flag in the segment is set (block 145), a cookie is constructed (block 146), as further described below with reference to FIG. 15. However, if the acknowledgement (ACK) flag is set (block 147), the segment is an acknowledgement segment and the ACK segment is checked (block 148), as further described below with reference to FIG. 16. Finally, if neither the SYN flag nor the ACK flag are set (blocks 145 and 147), the segment is unsolicited and possibly a DoS attack. A reset (RST) segment is sent to the sender and the segment is dropped (block 149). The routine then returns.

Figure 10:
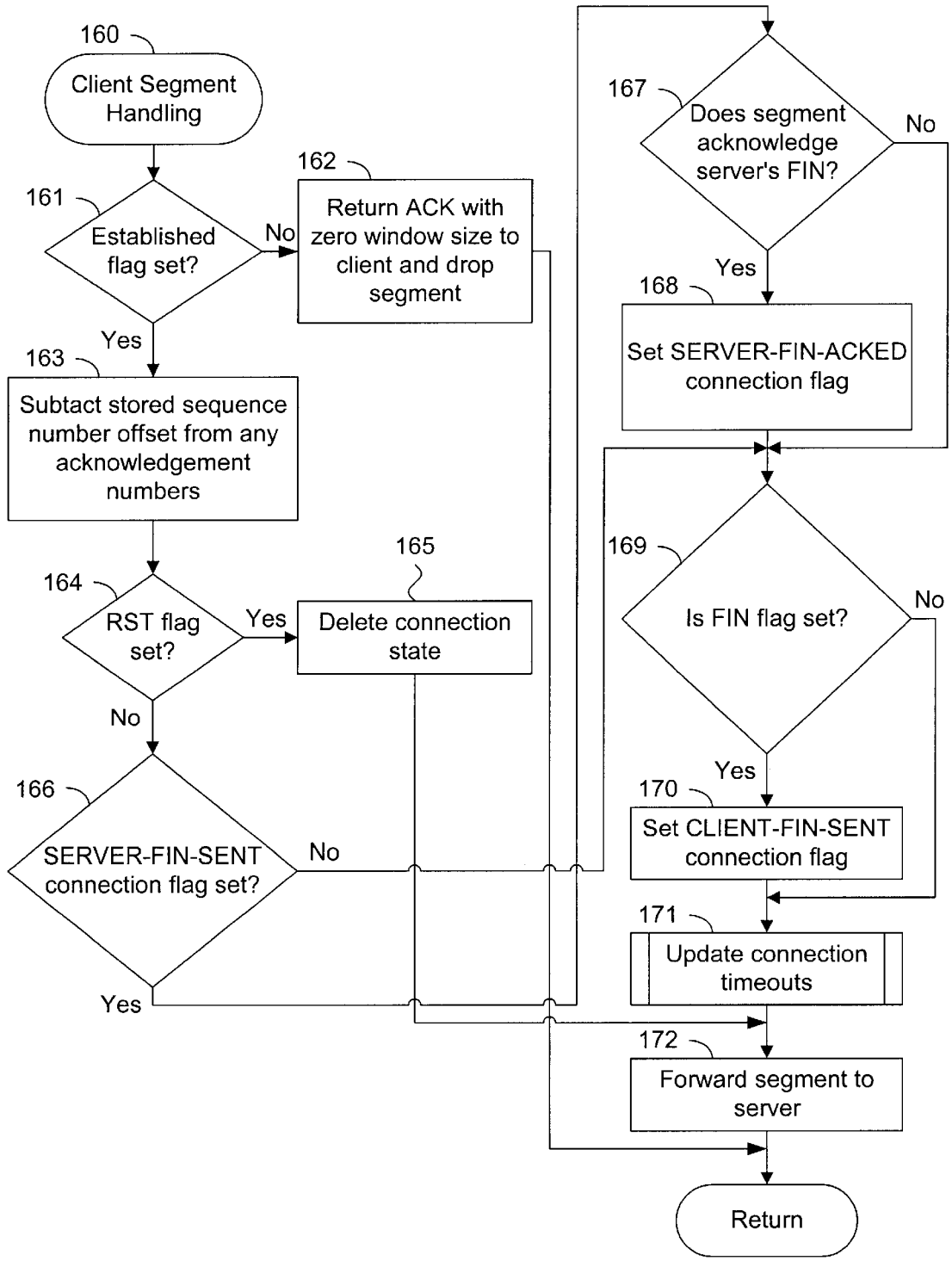
FIG. 10 is a flow diagram showing a routine for client segment handling for use in the routine of FIG. 9.

FIG. 10 is a flow diagram showing a routine for client segment handling 160 for use in the routine of FIG. 9. The purpose of this routine is to process a segment transiting between a requesting client and the authentication module 70. An internal flag indicates whether a connection has been established with the server. If the established flag has not been set (block 161), an acknowledgement (ACK) is returned and the client segment is dropped (block 162). In the returned ACK segment, the stored SYN cookie for this connection is used as the sequence number, the stored client sequence number plus one is used as the acknowledgement number, and the window size is set to zero. Using a zero window size causes the requesting client to temporarily refrain from sending more data under the assumption that the server is unable to accept additional data for the time being.

If the established flag is set (block 161), a connection has been established and the stored sequence number offset is subtracted from any acknowledgement numbers contained in the client segment (block 163). The stored sequence number offset reflects the difference between the pseudo-sequence number sent from the authentication system 72 to the requesting client and the real sequence number generated by the responding server. However, if the reset (RST) flag is set (block 164), the connection state is deleted (block 165) and the segment is forwarded to the server (block 172) to initiate a reset of the connection.

If the reset flag is not set (block 164), the routine begins checking for a session termination sequence. The system 72 maintains a set of connection flags for tracking the status of the termination of each half-duplex links for both the client-system and system-server connections, as follows:

1) SERVER-FIN-SENT: indicates server has initiated session termination.
2) SERVER-FIN-ACKED: indicates client has acknowledged session termination to server.
3) CLIENT-FIN-SENT: indicates client has initiated session termination.
4) CLIENT-FIN-ACKED: indicates server has acknowledged session termination to client.

Thus, if the SERVER-FIN-SENT connection flag is set (block 166) and the segment acknowledges a FIN segment sent by the server (block 167), the SERVER-FIN-ACKED connection flag is set (block 168). If the FIN flag is set in the segment (block 169), the CLIENT-FIN-SENT connection flag is set (block 170).

Regardless of connection termination state, the connection timeout variables are updated (block 171), as further described below with reference to FIG. 14. The segment is forwarded to the server (block 172) after updating the connection timeout variables. The routine then returns.

Figure 11A:
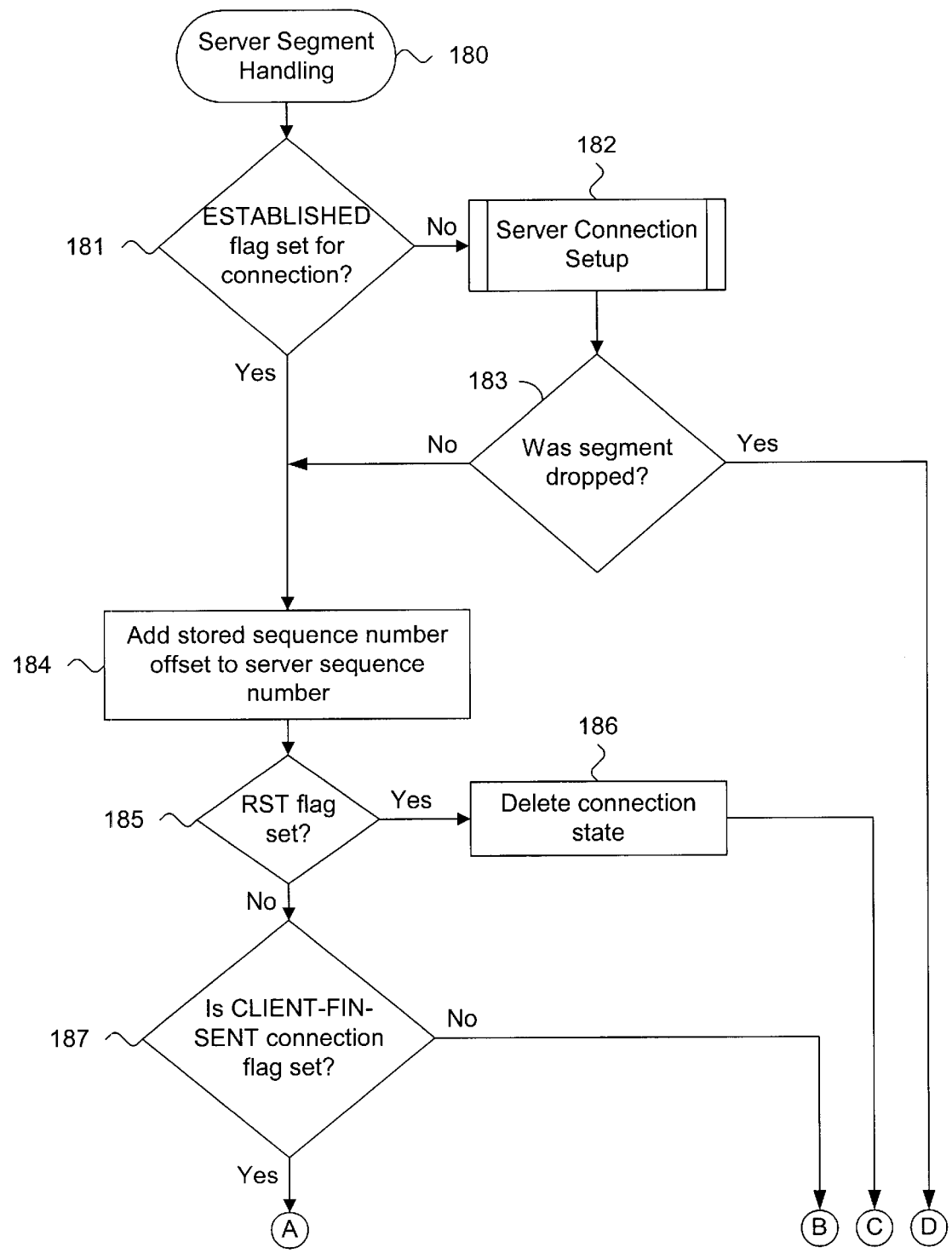
FIGS. 11A–11B are flow diagrams showing a routine for server segment handling for use in the routine of FIG. 9.
Figure 11B:
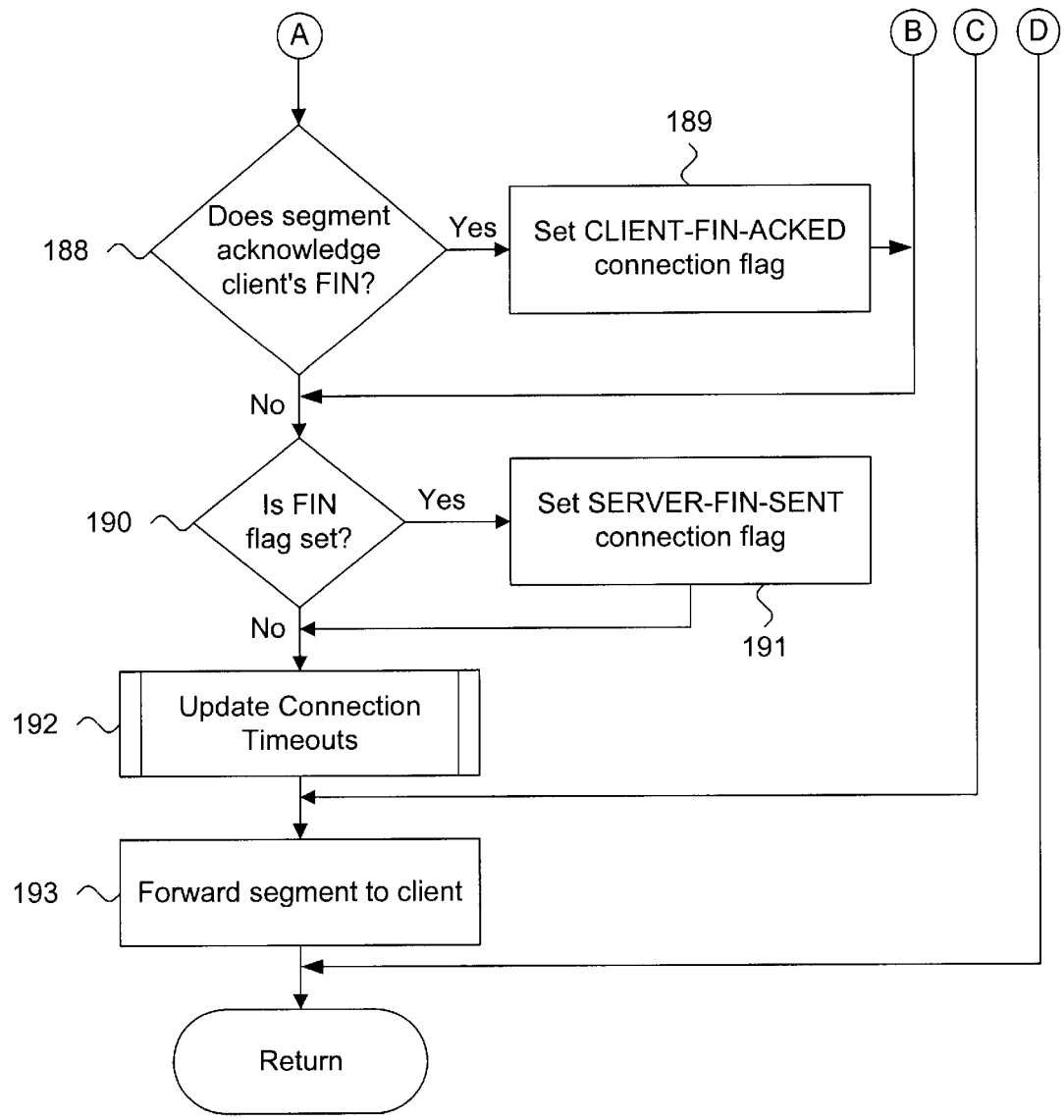

FIGS. 11A–11B are flow diagrams showing a routine for server segment handling 180 for use in the routine of FIG. 9. The purpose of this routine is to process a segment transiting between a responding server and the authentication module 70. If the ESTABLISHED flag is not set for the connection (block 181), the routine for setting up a server connection is called (block 182), as further described below with reference to FIG. 12. If the server connection routine drops the segment (block 183), the routine returns immediately. Otherwise, the stored sequence number offset is added to the sequence number contained in the server segment (block 184). The stored sequence number offset reflects the difference between the pseudo-sequence number sent from the authentication system 72 to the requesting client and the real sequence number generated by the responding server.

If the reset flag (RST) is set (block 185), the connection state is deleted (block 186) and the segment is forwarded to the client (block 193) to initiate a reset of the connection. Otherwise, if the CLIENT-FIN-SENT connection flag is set (block 187) and the segment acknowledges a FIN segment sent by the client (block 188), the CLIENT-FIN-ACKED connection flag is set (block 189). If the FIN flag is set (block 190), the SERVER-FIN-SENT connection flag is set (block 191). Connection timeouts are then updated (block 192), as further described below with reference to FIG. 14. Finally, the segment is forwarded to the client (block 193) and the routine returns.

Figure 12:
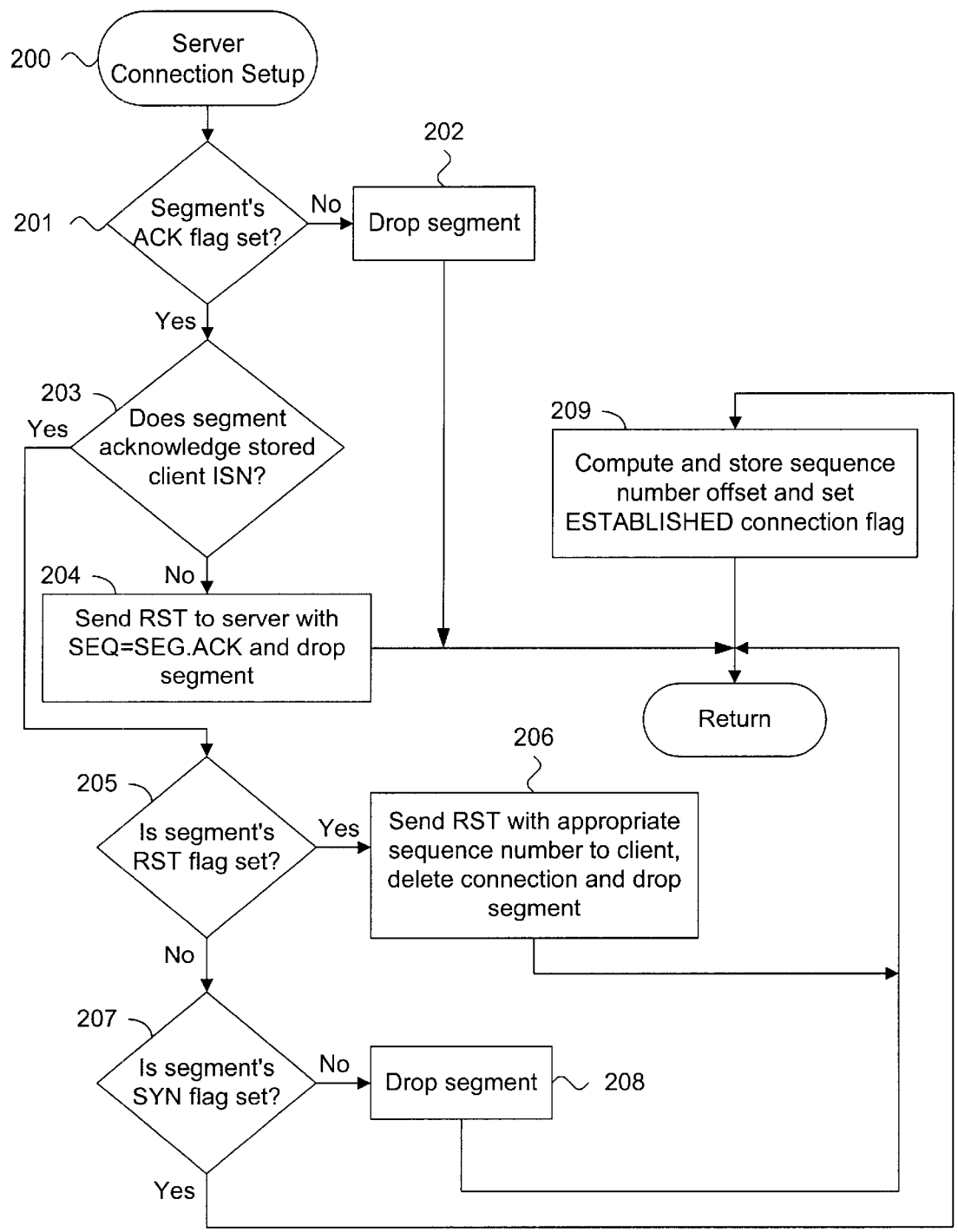
FIG. 12 is a flow diagram showing a routine for server connection setup for use in the routine of FIGS. 11A–11B.

FIG. 12 is a flow diagram showing a routine for server connection setup 200 for use in the routine of FIGS. 11A–11B. The purpose of this routine is to create a connection between the authentication system 72 and the server and to patch that connection into the validated connection between the authentication system 72 and the client. Thus, if the acknowledgement (ACK) flag for the segment is not set (block 201), the segment is dropped (block 202) under the assumption that the segment is unsolicited and the routine returns immediately.

If the segment does not provide an acknowledgement of a stored client initial sequence number (ISN) (block 203), a reset (RST) segment is sent to the server with a sequence number equal to the segment acknowledgement number, after which the segment is dropped (block 204) and the routine returns. Otherwise, if the reset (RST) flag in the segment is set (block 205), a reset (RST) segment is sent to the client with an appropriate sequence number (block 206), after which the connection is deleted and the segment dropped. The routine returns.

As well, if the synchronize (SYN) flag in the segment is not set (block 207), the segment is dropped (block 208) and the routine returns. Finally, the sequence number offset is computed and stored and the ESTABLISHED connection flag is set (block 209), indicating a successful session initiation. The routine then returns.

Figure 13:
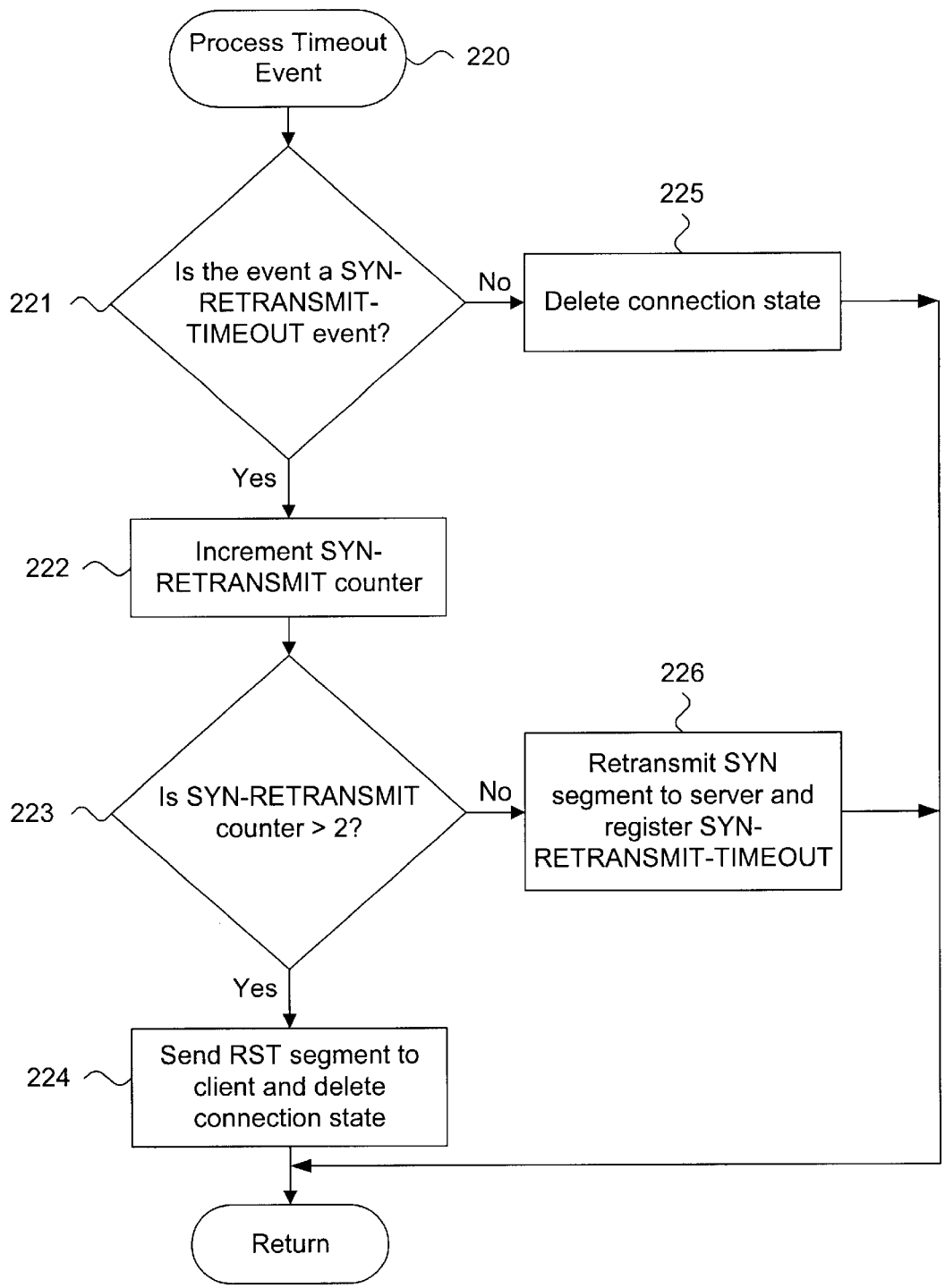
FIG. 13 is a flow diagram showing a routine for processing a timeout event for use in the method of FIG. 8.

FIG. 13 is a flow diagram showing a routine for processing a timeout event for use in the method of FIG. 8. The purpose of this routine is to enable the authentication system 92 to recover from a dropped connection tracked through timeout events. If the timeout event is a SYN-RETRANSMIT-TIMEOUT event (block 221), the SYN-RETRANSMIT counter is incremented (block 222). If the SYN-RETRANSMIT counter is greater than '2' (block 223), a SYN segment has twice been retransmitted to the server which has presumptively become non-responsive. An RST segment is sent to the client and the connection state is deleted (block 224), after which the routine returns. Otherwise, if the SYN-RETRANSMIT counter is less than or equal to '2' (block 223), a SYN segment is retransmitted to the server and another SYN-RETRANSMIT-TIMEOUT event is registered (block 226), after which the routine returns. Finally, if the timeout event is not a SYN-RETRANSMIT-TIMEOUT event (block 221), the connection state is deleted (block 225), after which the routine returns.

Figure 14:
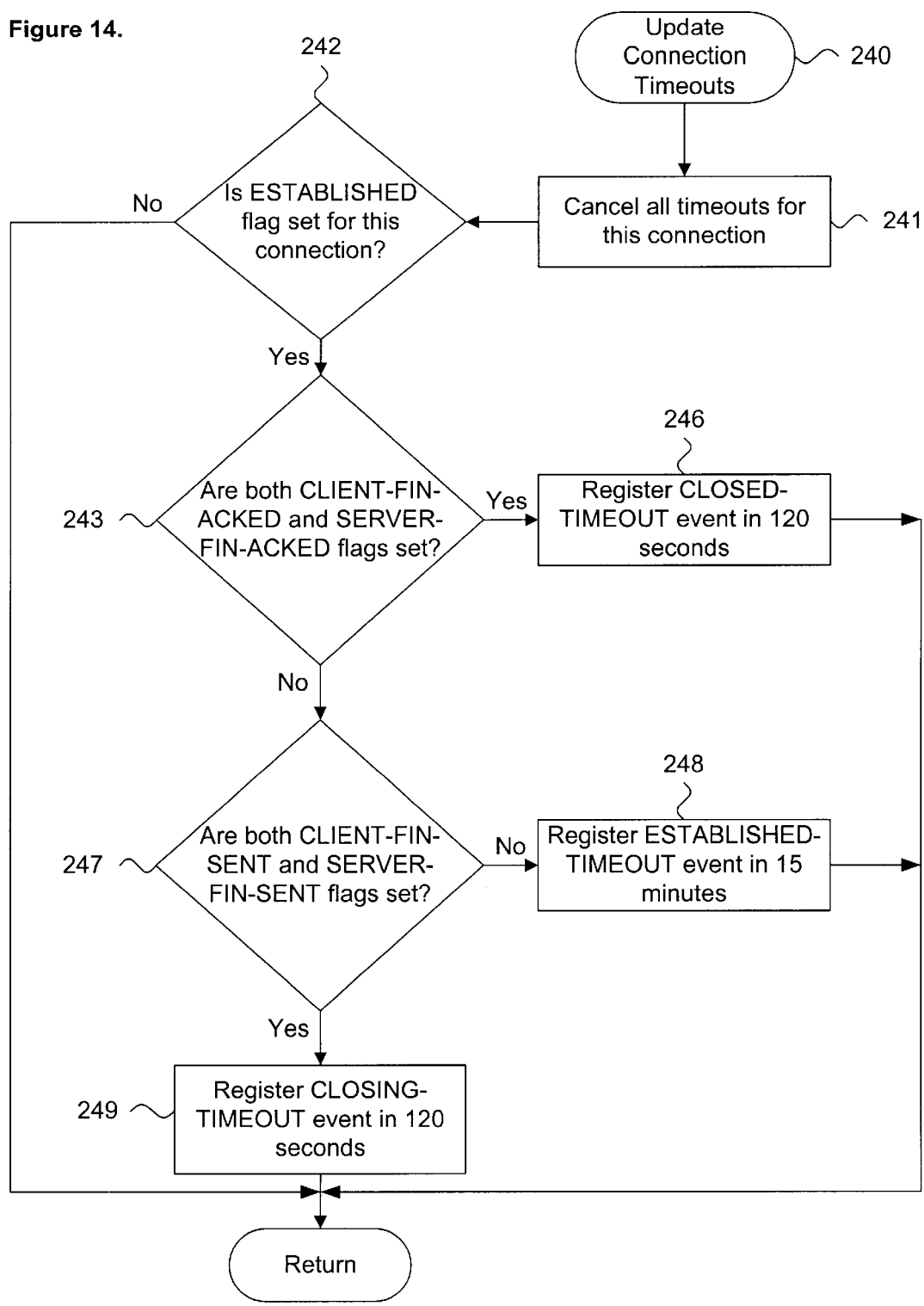
FIG. 14 is a flow diagram showing a routine for updating connection timeouts for use in the routine of FIG. 10 and in the routine of FIGS. 11A–11B.

FIG. 14 is a flow diagram showing a routine for updating connection timeouts for use in the routine of FIG. 10 and in the routine of FIGS. 11A–11B. The purpose of this routine is to periodically reset the timeout events used to track connections. All timeouts are first cancelled for the connection (block 241). If the ESTABLISHED flag is not set for this connection (block 242), the routine returns. Otherwise, if both of the CLIENT-FIN-ACKED and SERVER-FIN-ACKED flags are set (block 243), a CLOSED-TIMEOUT event is registered to occur in approximately 120 seconds (block 246), after which the routine returns. Alternatively, if both the CLIENT-FIN-SENT and SERVER-FIN-SENT flags are set (block 247), a CLOSING-TIMEOUT event is registered to occur in approximately 120 seconds, after which the routine returns. Otherwise, if either or both of the CLIENT-FIN-SENT and SERVER-FIN-SENT flags are not set (block 247), an ESTABLISHED-TIMEOUT event is registered to occur in approximately 15 minutes, after which the routine returns.

Note that these timeout values can be adjusted to balance state consumption against robustness in unreliable networking environments. In particular, the ESTABLISHED-TIMEOUT event can be replaced by a scheme in which the system sends "keep-alive" segments to the server and client during periods of inactivity. Other timeout tracking schemes are possible.

Figure 15:
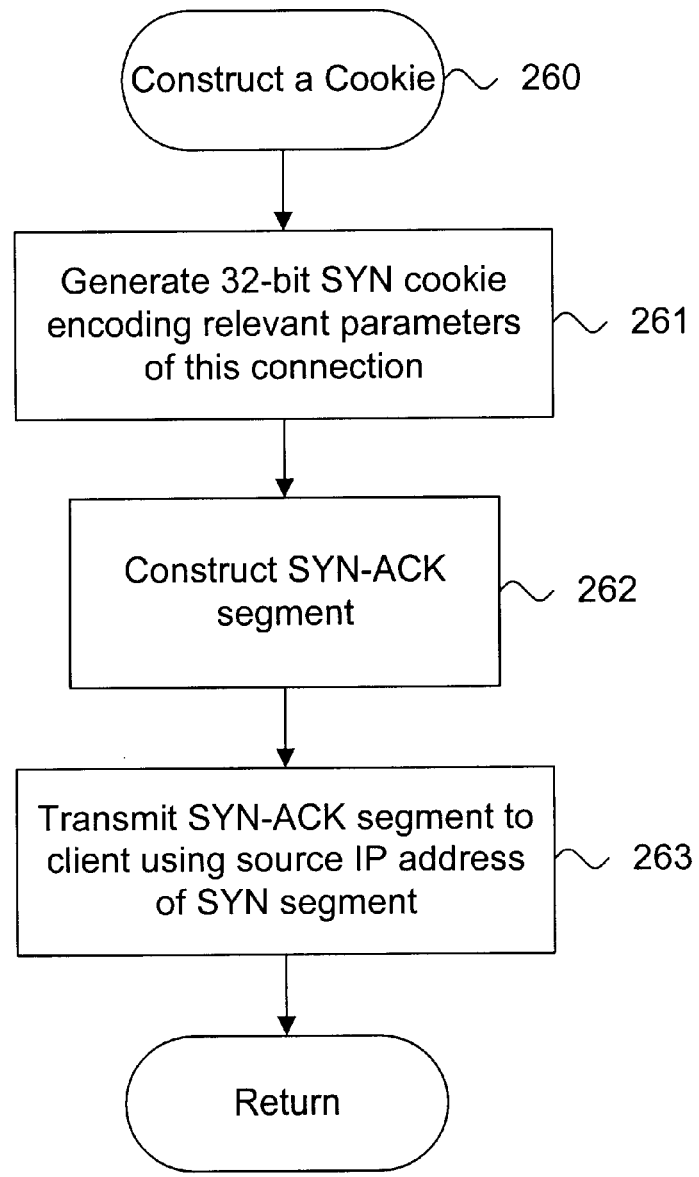
FIG. 15 is a flow diagram showing a routine for constructing a cookie for use in the routine of FIG. 9.

FIG. 15 is a flow diagram showing a routine for constructing a cookie 260 for use in the routine of FIG. 9. The purpose of this routine is to generate a cryptographic checksum. Thus, a 32-bit SYN cookie is constructed by encoding relevant parameters obtained from the current connection (block 261). In the described embodiment, SYN cookies are generated using the technique described in D. Bernstein et al., "TCP SYN Cookies," http.//cr.yp.to/syncookies.html (1996), the disclosure of which is incorporated by reference.

One possible encoding for calculating the "cookie" (SYN-ACK segment sequence number) is the following:

$$\text{Cookie} = ((\text{hash}(s, 0, \text{saddr}, \text{sport}, \text{daddr}, \text{dport}) + \text{isn} + (\text{ctr} << 24) + (\text{hash}(s, 1, \text{ctr}, \text{saddr}, \text{sport}, \text{daddr}, \text{dport}) \% (1 << 24))) << 3) + m$$

Here, all arithmetic is by 32-bit two's complement. The '%,' '<<,' and '+' operators are integer remainder, bit wise left shift, and addition operators, such as used in the C programming language. The value 's' is a secret seed value known only to the system 72. The value 'ctr' is a counter that is incremented periodically. The values 'saddr,' 'sport,' 'daddr,' and 'dport' are the source IP address and port and the destination IP address and port of the received SYN segment. The value 'isn' is the initial sequence number from the received SYN segment. The value 'm' is a three-bit encoding of a conservative approximation to the Maximum Segment Size value in the received SYN segment. The function 'hash' represents the low-order 32 bits of the result of a cryptographic hash function, such as MD5 or SHA-1.

Next, a SYN-ACK segment 95 (see FIG. 6) is constructed (block 262) using the calculated cookie as the sequence number and transmitted to the client using the internet protocol (IP) address contained in the header of the SYN segment (block 263). This SYN cookie technique allows the identify of the requesting client to be validated by using a substantially non-forgeable sequence number which is only reflected back if the requesting client is valid. Finally, the routine returns.

Figure 16:
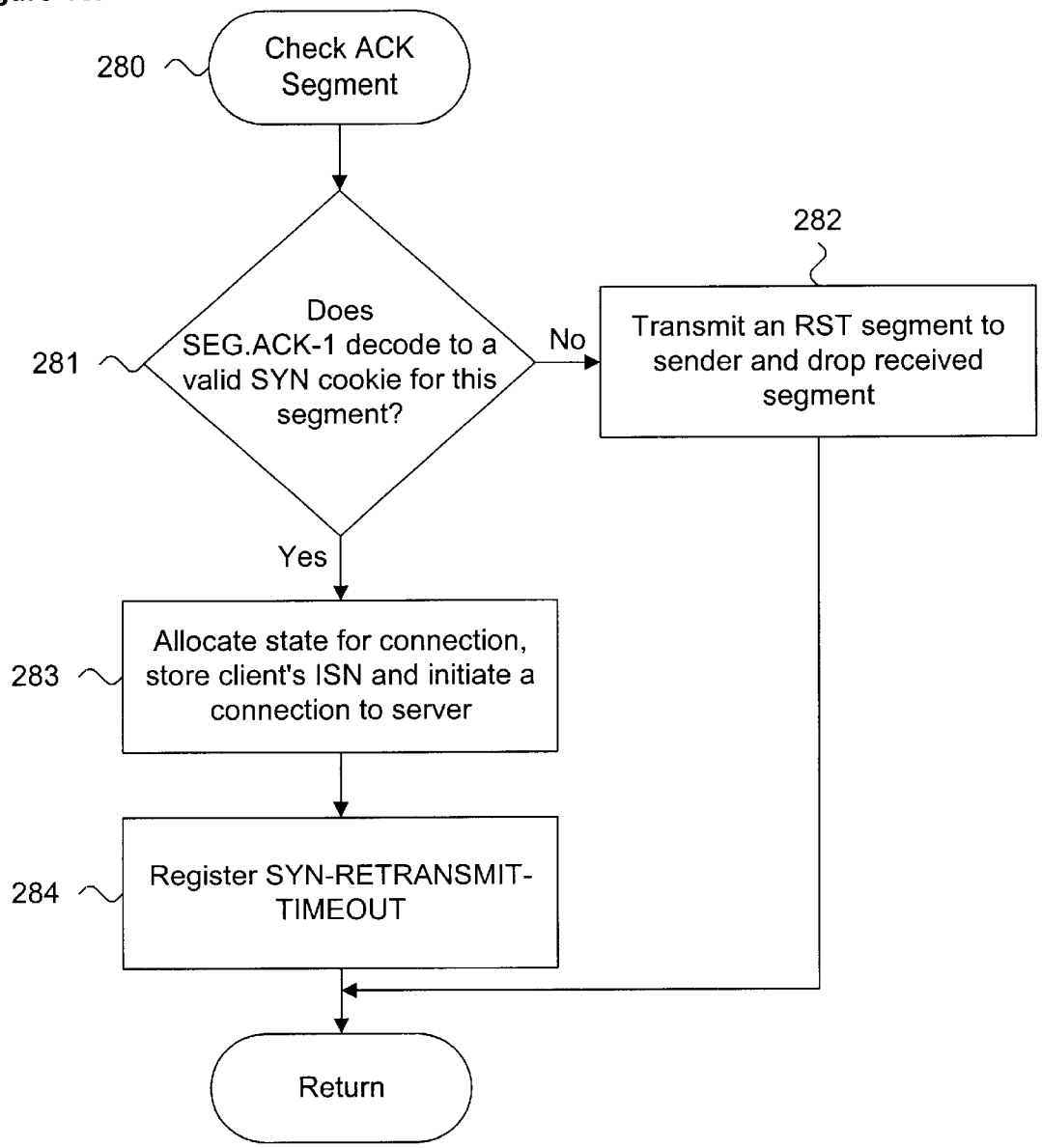
FIG. 16 is a flow diagram showing a routine for checking an acknowledgement segment for use in the routine of FIG. 9.

FIG. 16 is a flow diagram showing a routine for checking an acknowledgement segment 280 for use in the routine of FIG. 9. The purpose of this routine is to validate an echoed acknowledgement number using the SYN cookie technique, described above. If the acknowledgement number in the segment, minus one to offset incrementing performed by the sending client, decodes to a valid SYN cookie using the parameters for the current connection (block 281), a connection is formed. State is allocated for the connection, the initial sequence number (ISN) for the client is stored, and a connection to the server is initiated (block 283) by sending a SYN segment containing the client's initial sequence number. Next, a SYN-RETRANSMIT-TIMEOUT value is registered (block 284), as described above. The routine then returns.

Alternatively, if the echoed acknowledgement number does not decode to a valid SYN cookie (block 281), a reset (RST) segment is transmitted to the sender and the segment is dropped (block 282), under the assumption that the segment is unsolicited and possibly a DoS attack. The routine then returns.

Thus, the present invention provides an approach to protecting a server from DoS attacks by intercepting and authenticating session requests. Using SYN cookies, only authenticated session requests are allowed to proceed to create a session between the server and a requesting client.

This approach functions in a TCP-based environment, as well as in any other session-oriented environment, in which a three-way handshake is performed to initiate a communication session. In addition, this approach functions entirely with TCP and does not rely on acknowledgement packets sent in other protocols. For instance, "ping" packets could be used with the Internet Control Message Protocol (ICMP). However, ICMP headers do not include ports and, consequently, ICMP-based solutions will not work in those networked computing environments using dynamic network address translation.

While the invention has been particularly shown and described as referenced to the embodiments thereof, those skilled in the art will understand that the foregoing and other changes in form and detail may be made therein without departing from the spirit and scope of the invention.

What is claimed is:

1. A system for transacting a validated application session in a networked computing environment, comprising:
   a hierarchical protocol stack comprising a plurality of interfaced protocol layers including a connection-based session protocol layer;
   an authentication module opening a session with a requesting client responsive to a request packet containing a source address of uncertain trustworthiness, comprising negotiating a client connection with the requesting client including performing a stateless validation of the source address contained in the request packet using encoded information obtained from the request packet headers and negotiating a server connection with a responding server upon successful validation of the requesting client;
   a translation module facilitating the session by translating packets independently exchanged over the client connection and the server connection; and
   a termination module closing the session through a controlled termination of each of the client connection and the server connection.

2. A system according to claim 1, further comprising:
   a checksum module calculating a checksum from the information included in the request packet headers;
   the authentication module generating a request acknowledgement packet containing the checksum as a pseudo sequence number and using the source address contained in the request packet as a destination address;
   the checksum module calculating a validation checksum from information included in acknowledgement packet headers of an acknowledgement packet received in response to the request acknowledgement packet; and
   a comparison module comparing the validation checksum to the acknowledgement number of the acknowledgement packet.

3. A system according to claim 2, further comprising:
   the checksum module generating a SYN cookie as the validation checksum.

4. A system according to claim 3, wherein the information obtained from the request packet headers comprises parameters selected from the group comprising the destination address, the source address, the destination port number, the source port number, the sequence number, a secret value, and a periodically incremented counter value.

5. A system according to claim 3, further comprising:
   a packet module allocating state upon a successful comparison of the validation checksum and the acknowledgment number of the acknowledgement packet.

6. A system according to claim 1, the operation of facilitating the session further comprising:
   the translation module translating sequence numbers on in-transit packets by applying a stored offset between client connection sequence numbers and server connection sequence numbers.

7. A system according to claim 1, the operation of facilitating the session further comprising:
   the termination module terminating each of the client connection and the server connection through finished packet exchanges for each of a pair of half-duplex links for both the client connection and the server connection, each such link providing packet flow in an opposite direction.

8. A system according to claim 1, wherein the connection-based session protocol layer comprises the Transmission Control Protocol (TCP).

9. A method for transacting a validated application session in a networked computing environment, comprising:
   defining a hierarchical protocol stack comprising a plurality of interfaced protocol layers including a connection-based session protocol layer;
   opening a session with a requesting client responsive to a request packet containing a source address of uncertain trustworthiness, comprising:
      negotiating a client connection with the requesting client including performing a stateless validation of the source address contained in the request packet using encoded information obtained from the request packet headers;
      negotiating a server connection with a responding server upon successful validation of the requesting client;
   facilitating the session by translating packets independently exchanged over the client connection and the server connection; and
   closing the session through a controlled termination of each of the client connection and the server connection.

10. A method according to claim 9, the operation of performing a stateless validation further comprising:
   calculating a checksum from the information included in the request packet headers;
   generating a request acknowledgement packet containing the checksum as part of a pseudo sequence number and using the source address contained in the request packet as a destination address;
   calculating a validation checksum from information included in acknowledgement packet headers of an acknowledgement packet received in response to the request acknowledgement packet; and
   comparing the validation checksum to the acknowledgement number of the acknowledgement packet.

11. A method according to claim 10, further comprising:
   generating a SYN cookie as the validation checksum.

12. A method according to claim 11, wherein the information obtained from the request packet headers comprises parameters selected from the group comprising the destination address, the source address, the destination port number, the source port number, the sequence number, a secret value, and a periodically incremented counter value.

13. A method according to claim 11, further comprising:
allocating state upon a successful comparison of the validation checksum and the acknowledgment number of the acknowledgement packet.

14. A method according to claim 9, the operation of facilitating the session further comprising:
translating sequence numbers on in-transit packets by applying a stored offset between client connection sequence numbers and server connection sequence numbers.

15. A method according to claim 9, further comprising:
terminating each of the client connection and the server connection through finished packet exchanges for each of a pair of half-duplex links for both the client connection and the server connection, each such link providing packet flow in an opposite direction.

16. A method according to claim 9, wherein the connection-based session protocol layer comprises the Transmission Control Protocol (TCP).

17. A computer-readable storage medium holding code for transacting a validated application session in a networked computing environment, comprising:
defining a hierarchical protocol stack comprising a plurality of interfaced protocol layers including a connection-based session protocol layer;
opening a session with a requesting client responsive to a request packet containing a source address of uncertain trustworthiness, comprising:
negotiating a client connection with the requesting client including performing a stateless validation of the source address contained in the request packet using encoded information obtained from the request packet headers;
negotiating a server connection with a responding server upon successful validation of the requesting client;
facilitating the session by translating packets independently exchanged over the client connection and the server connection; and
closing the session through a controlled termination of each of the client connection and the server connection.

18. A storage medium according to claim 17, the operation of performing a stateless validation further comprising:
calculating a checksum from the information included in the request packet headers;
generating a request acknowledgement packet containing the checksum as part of a pseudo sequence number and using the source address contained in the request packet as a destination address;
calculating a validation checksum from information included in acknowledgement packet headers of an acknowledgement packet received in response to the request acknowledgement packet; and
comparing the validation checksum to the acknowledgement number of the acknowledgement packet.

19. A storage medium according to claim 18, further comprising:
generating a SYN cookie as the validation checksum.

20. A storage medium according to claim 19, further comprising:
allocating state upon a successful comparison of the validation checksum and the acknowledgment number of the acknowledgement packet.

21. A storage medium according to claim 17, the operation of facilitating the session further comprising:
translating sequence numbers on in-transit packets by applying a stored offset between client connection sequence numbers and server connection sequence numbers.

22. A storage medium according to claim 17, further comprising:
terminating each of the client connection and the server connection through finished packet exchanges for each of a pair of half-duplex links for both the client connection and the server connection, each such link providing packet flow in an opposite direction.

* * * * *